(12) United States Patent
Schuler et al.

(10) Patent No.: US 7,983,426 B2
(45) Date of Patent: Jul. 19, 2011

(54) METHOD FOR AUTONOMOUSLY MONITORING AND REPORTING SOUND PRESSURE LEVEL (SPL) EXPOSURE FOR A USER OF A COMMUNICATION DEVICE

(75) Inventors: Francesca Schuler, Des Plaines, IL (US); Di-An Hong, Inverness, IL (US); Krishna D. Jonnalagadda, Algonquin, IL (US); Kaustubh R. Kale, Sunrise, FL (US); Alif Khawand, Miami, FL (US); Jose C. Lacal, Boynton Beach, FL (US); Padmaja Ramadas, Davie, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 1236 days.

(21) Appl. No.: 11/648,249

(22) Filed: Dec. 29, 2006

(65) Prior Publication Data

US 2008/0159547 A1    Jul. 3, 2008

(51) Int. Cl.
*H04R 29/00* (2006.01)
(52) U.S. Cl. .......... 381/56; 340/540; 340/573.1; 73/646
(58) Field of Classification Search .......... 340/540, 340/573.1, 683; 381/56, 72, 372, 58, 59, 381/376; 73/646; 379/38, 430, 428.02
See application file for complete search history.

(56) References Cited

U.S. PATENT DOCUMENTS

| | | | | |
|---|---|---|---|---|
| 3,778,552 A * | 12/1973 | Edinborgh | | 73/645 |
| 4,073,194 A | 2/1978 | Willson et al. | | |
| 4,307,385 A * | 12/1981 | Evans et al. | | 340/540 |
| 4,554,639 A * | 11/1985 | Baker et al. | | 702/1 |
| 6,456,199 B1 * | 9/2002 | Michael | | 340/573.1 |
| 6,507,650 B1 * | 1/2003 | Moquin | | 379/387.01 |
| 6,826,515 B2 * | 11/2004 | Bernardi et al. | | 702/191 |
| 7,050,796 B2 | 5/2006 | Humphrey et al. | | |
| 7,092,853 B2 | 8/2006 | Collier et al. | | |
| 7,151,835 B2 * | 12/2006 | Yonovitz et al. | | 381/56 |
| 7,836,771 B2 * | 11/2010 | Killion | | 73/647 |
| 2006/0025120 A1 | 2/2006 | Kuramatsu | | |
| 2006/0042866 A1 | 3/2006 | Widmer et al. | | |
| 2006/0108428 A1 | 5/2006 | Broere | | |
| 2006/0191326 A1 | 8/2006 | Smith et al. | | |

\* cited by examiner

*Primary Examiner* — Vivian Chin
*Assistant Examiner* — Jason R Kurr

(57) ABSTRACT

A method for monitoring and reporting sound pressure level exposure for a user of a first communication device (104) is implemented in one embodiment when the device measures a sound pressure level (SPL) of the surrounding environment. The device stores at least the SPL measurement in a memory, producing an SPL exposure record, and displays a visual representation of the SPL exposure record on a display screen (212). In another embodiment, the SPL is measured by a second communication device (102) and combined with a known SPL for an output audio transducer (306) of the second device, producing a user sound exposure level. The user sound exposure level is transmitted to the first communication device. The user is notified when the user sound exposure level exceeds a predetermined threshold. A server (112) may also be used to track SPLs over time and recommend corrective action when exposure limits are exceeded.

14 Claims, 10 Drawing Sheets

METHOD FOR AUTONOMOUSLY MONITORING AND REPORTING SOUND PRESSURE LEVEL (SPL) EXPOSURE FOR A USER OF A COMMUNICATION DEVICE

FIELD OF THE INVENTION

The present invention relates generally to the field of wireless communication systems and, more particularly, to a method for autonomously monitoring and reporting sound pressure level exposure for a user of a communication device.

BACKGROUND OF THE INVENTION

Sound level exposure is a safety and preventative health concern for many environments. Exposure to extremely loud noises, even for a short period of time, can cause permanent hearing damage. Additionally, extended exposure to sound, even at modest levels, may cause hearing loss over time. In the workplace, regulatory agencies, such as the Occupational Safety and Health Administration (OSHA), the National Institute for Occupational Safety and Health (NIOSH), the United States Department of Health and Human Services, and others, set standard allowable exposure levels and require employers to monitor the sound pressure levels (SPLs) in their employees' work environment. However, extreme sound levels incurred by recreational exposure have become increasingly alarming with the prevalent use of stereo headphones and earpieces. Children and teenagers are particularly vulnerable to overexposure as they do not realize the dangers caused by excessive sound levels. Currently, there is no method to monitor sound pressure level exposure for a user of an audio communication device.

Additionally, approximately 30 million people in the United States are exposed to hazardous occupational noise each year. Fortunately, noise-induced hearing loss can be reduced or eliminated by successful application of hearing conservation programs, protective devices, and engineering controls. Currently, employers are required to measure the noise level of their employee's work environment. The exposure measurement includes continuous, intermittent, and impulsive noise within the 80 dB to 130 dB range. Each measurement must be taken in a typical work situation and the employer must provide noise suppression devices to meet a standard noise rejection rating (NPR). Additional measurements are required whenever there is a change in the work environment, such as changes in production methods, different or additional equipment, or the introduction of additional workers in the current environment.

Presently, occupational SPL monitoring is accomplished using expensive external devices and the measurements are taken sporadically. Under typical circumstances, a person (e.g., employee or member of a company's occupational safety group) physically performs the measurement at a given time and place, using a dedicated monitoring device. However, noise levels in a given environment are not constant and will often change during the course of the day or from one point in the workplace to another. As a result, existing SPL monitoring schemes are not able to capture SPL exposure for a given individual on a continuous or regular basis. Additionally, certain employees may be encountering higher noise levels than others because they work different shifts or handle different tools. Therefore, even if an employer is complying with regulatory guidelines with respect to employee SPL exposure, certain employees may still be routinely exposed to dangerous levels of noise.

Therefore, a need exists for, among other things, a method for autonomously monitoring and reporting sound pressure level exposure that overcomes the shortcomings of the prior art.

SUMMARY

Generally, the present invention encompasses a method for autonomously monitoring and reporting sound pressure level (SPL) exposure for a user of a communication device. In one embodiment, the communication device measures the SPL for an environment surrounding the communication device. The communication device stores the SPL measurement in an SPL exposure record contained in a memory of the communication device. The device also displays a visual representation of the SPL exposure record on its display screen. The visual representation of the SPL exposure record may include an instantaneous SPL, an average SPL, and a cumulative SPL. The SPL measurement may be further compared to a predetermined threshold which is calculated as a function of allowable SPL versus time. The communication device alerts the user in the event that the SPL measurement exceeds the predetermined threshold. Additionally, the allowable SPL versus time function may be customized for a given user of the communication device.

In one embodiment, the communication device delays taking an SPL measurement in the event that the device is engaged in a phone call at a time scheduled for SPL measurement.

In an alternative embodiment, a method for monitoring and reporting sound pressure level exposure for a user of a first communication device is implemented by measuring the SPL of the environment surrounding the first communication device at a predetermined time interval. The measured SPL is combined with a known SPL for an output audio transducer of the first communication device, producing a cumulative user sound exposure level. The user sound exposure level is transmitted to a second communication device. In one embodiment, the second communication device is a wireless telephone and the first communication device is a wireless audio device for use in cooperation with the wireless telephone. The SPL may be measured using a microphone, a directional microphone, or a multi-directional microphone located on either of the communication devices.

In an alternative embodiment, a method for monitoring and reporting sound pressure level exposure for a user of a first communication device is implemented when a second communication device receives an SPL exposure record containing a user sound exposure level measured by the first communication device. The user sound exposure level may be calculated as a weighted sum of an SPL measurement of the environment surrounding the first communication device and a known SPL for at least one output audio transducer of the first communication device. The second communication device stores the SPL exposure record in its memory and displays a visual representation of the SPL exposure record on its display screen.

In one embodiment, the second communication device compares the user sound exposure level to a predetermined threshold, customized for the user, and calculated as a function of allowable SPL versus time. The second communication device alerts the user of the first communication device in the event that the user sound exposure level exceeds the predetermined threshold. Additionally, the second communication device may transmit a message to the first communication device, instructing the device to automatically reduce a volume level of the output audio transducer until the user sound exposure level is reduced to a level below the predetermined threshold.

In an alternative embodiment, a SPL tracking server may receive SPL exposure records from one or more communication devices. Each SPL exposure record includes an SPL measurement. In an alternative embodiment, each SPL exposure record may also contain a date, a time, a user identifier and/or a communication device identifier. The server stores the SPL records in an accessible memory and displays a visual representation of at least one SPL exposure record on a display screen of one of the communication devices or of a remote terminal. Additionally, the server may compare the user sound exposure level for a particular user to a predetermined threshold. The threshold is calculated by an allowable SPL versus time function for the user. The server then sends an alert to the communication device in the event that the user sound exposure level exceeds the predetermined threshold. The allowable SPL versus time function may be customized for each user and depends upon a type of preventive hearing device worn by the particular user. Additionally, the function may be determined based on an audiogram for the particular user.

In another embodiment, the server may advise the user to take corrective action intended to prevent hearing loss. The corrective action may include moving to a quieter location based on an SPL measurement and a location received from another communication device.

DETAILED DESCRIPTION

Figure 1:
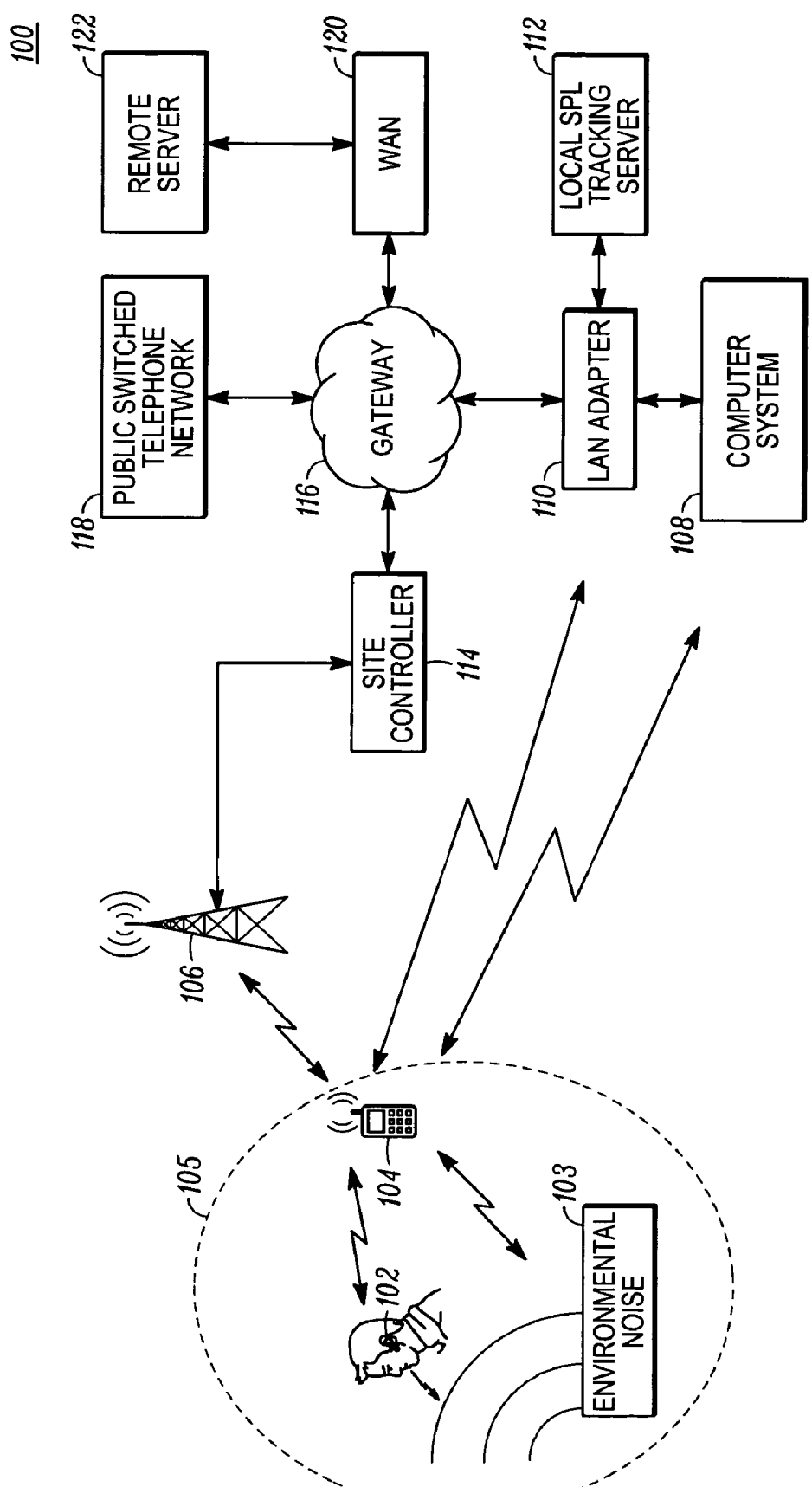
FIG. 1 is a block diagram of an exemplary communication system in accordance with one embodiment of the present invention.

Before describing in detail exemplary embodiments that are in accordance with the present invention, it should be observed that the embodiments reside primarily in combinations of apparatus components and processing steps related to implementing a method for monitoring and reporting SPL exposure for a user of a communication device. Accordingly, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms, such as "first" and "second," "top" and "bottom," and the like, are used solely to distinguish one entity or element from another entity or element without necessarily requiring or implying any physical or logical relationship or order between such entities or elements. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

The terms "wireless communication device," "portable communication device," and "mobile communication device" are used interchangeably herein and are intended to broadly cover many different types of devices that can wirelessly receive signals, and optionally can wirelessly transmit signals, and may also operate in a wireless communication system. For example, and not by way of limitation, a wireless, portable, or mobile communication device may include any one or a combination of the following: a cellular telephone, a mobile phone, a smart phone, a two-way radio, a two-way pager, a wireless messaging device, a laptop or personal computer, a personal digital assistant (PDA), a wireless email device, a portable gaming device including a built-in wireless modem, a wireless headset, an audio and/or video player, and the like. The term "communication device," as used herein, is intended to broadly cover any device that exchanges information with another device. A communication device may include a wireless communication device, or a non-wireless communication device (e.g., a desktop or personal computer). The term "environmental noise" includes any ambient noise or discernable sound in a given area surrounding a communication device or a user thereof, which is capable of being detected by a human ear, a microphone or other noise detection device included in or attached to the communication device.

It will be appreciated that embodiments of the invention described herein may be comprised of one or more conventional processors and unique stored program instructions that control the one or more processors to implement, in conjunction with certain non-processor circuits, some, most, or all of the functions for autonomously monitoring and reporting SPL exposure for a user of a communication device as described herein. The non-processor circuits may include, but are not limited to, a radio receiver, a radio transmitter, signal drivers, clock circuits, power source circuits, and user input devices. As such, the functions performed by these processor and/or non-processor circuits may be interpreted or referred to herein as steps of a method to automatically monitor and report SPL exposure for a user of a communication device. Alternatively, some or all the recited functions could be implemented by a state machine that has no stored program instructions, or in one or more application specific integrated circuits (ASICs), in which each function or some combination of the functions are implemented as custom logic. Of course, a combination of the two approaches could be used. Thus, methods and means for these functions are described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) without undue experimentation.

The present invention encompasses an autonomous and inexpensive method for measuring and monitoring sound pressure level exposure for a user of a communication device. The present invention monitors the sound level of surrounding environmental noise using, in one embodiment, sound level detection circuitry already integrated into a portable communication device and provides visual feedback to the user detailing his or her SPL exposure based on predetermined recommended exposure levels (e.g., OSHA specifications or other hearing guidelines).

In an alternative embodiment of the present invention, the SPL exposure for the user may be transmitted from the communication device and stored in a remote server or other database for further review or historical tracking. In this manner, an employer, a user, a parent, a physician, or any other interested party may monitor the level of sound to which the user is exposed and may easily enforce preventative measures to avert temporary or permanent hearing loss. Additionally, SPL exposure information for the user of one communication device may be transferred directly to a second communication device for remote tracking purposes.

The present invention can be more readily understood with reference to FIGS. 1-10, in which like reference numerals designate like items. FIG. 1 depicts an exemplary communication system 100 in accordance with one embodiment of the present invention. In this exemplary embodiment, a user of a portable communication device 104 is within an area 105 containing environmental noise 103. The environmental noise 103 may be general ambient noise or may originate from an occupational noise source (e.g., one or more construction or manufacturing machines), from everyday noise sources (e.g., traffic, sporting events, concerts, etc.), or from the use of electronic devices (e.g., a wireless headset 102, a mobile phone 104, a television, a portable audio or video player, or any other source of sound).

In the embodiment depicted in FIG. 1, the communication system 100 is a wireless communication system that connects the portable communication device 104 to other communication devices and/or to other networks, such as a wide-area network 120 (e.g., the Internet), a public switched telephone network (PSTN) 118 and the like, via at least one base station 106. The base station 106 is operated by a site controller 114, which connects the base station 106 to the other networks via a gateway 116, a mobile switching controller, or other conventional routing and/or switching equipment. The portable communication device 104 is preferably accessible to a local sound pressure level (SPL) tracking server 112 and/or a computer system 108 via a local area network (LAN) access point 110 or adapter. The portable communication device 104 may also be accessible to a remote server 122 via, for example, the LAN access point 110, the gateway 116, and/or the WAN 120.

When the communication system 100 is a wireless communication system, the system 100 may comprise, inter alia, a mobile phone network, a mobile text messaging device network, a wireless local area network (WLAN), a pager network, or the like. In one embodiment, the portable communication device 104 is equipped with wireless technology that allows the device to communicate directly with the computer system 108 or other portable communication devices in a peer-to-peer configuration using the Bluetooth® short-range wireless protocol, the Infrared Data Association (IrDA) protocol, or any other communication standards or protocols, including, but not limited to, the IEEE 802.11 (Wi-Fi) family of standards, the IEEE 802.16 (Wi-MAX) family of standards, the Zigbee standard, and/or the Ultra-Wideband (UWB) standard. The portable communication device 104 may also communicate with other local communication devices using the above standards via the LAN access point 110.

In an alternative embodiment, the communication system 100 may be a wired system, such as a conventional computer network operating over an Ethernet backbone. In such case, the communication device 104 may be a desktop or notebook computer modified to incorporate the present invention.

In one embodiment, the computer system 108 is communicatively coupled to the LAN access point 110 via a network interface card (not shown), which may be wired, wireless, or any combination thereof. Additionally, the LAN access point 110 may provide connectivity to a local SPL tracking server 112, which stores an SPL exposure database.

The communication standard or protocol of the wireless communication system 100 may include any conventional protocol or multiple access technique, including, without limitation, Code Division Multiple Access (CDMA), Time Division Multiple Access (TDMA), Global System for Mobile Communications (GSM), Enhanced Data GSM Environment (EDGE), General Packet Radio Service (GPRS), Frequency Division Multiple Access (FDMA), or Orthogonal Frequency Division Multiplexing (OFDM). Additionally, the wireless communication system 100 may further utilize media messaging standards, such as, Short Message Service (SMS), Enhanced Messaging Service (EMS), Multimedia Messaging Service (MMS), or any other protocols for conveying text or video messages. The wireless communication system 100 may further facilitate push-to-talk or dispatch over cellular communications between capable wireless communication devices.

The wireless communication system 100 supports any number of wireless communication devices 104 and/or wireline communication devices (e.g., PCs). For example, the wireless communication system 100 of FIG. 1 supports mobile telephones, smart phones, text messaging devices, PDAs, handheld computers, pagers, beepers, wireless communication cards, handheld video game systems incorporating wireless access technology, or the like. A smart phone is a mobile telephone that has additional application processing capabilities. For example, a smart phone may include a combination of 1) a pocket PC, handheld PC, palm top PC, or PDA, and 2) a mobile telephone.

Figure 2:
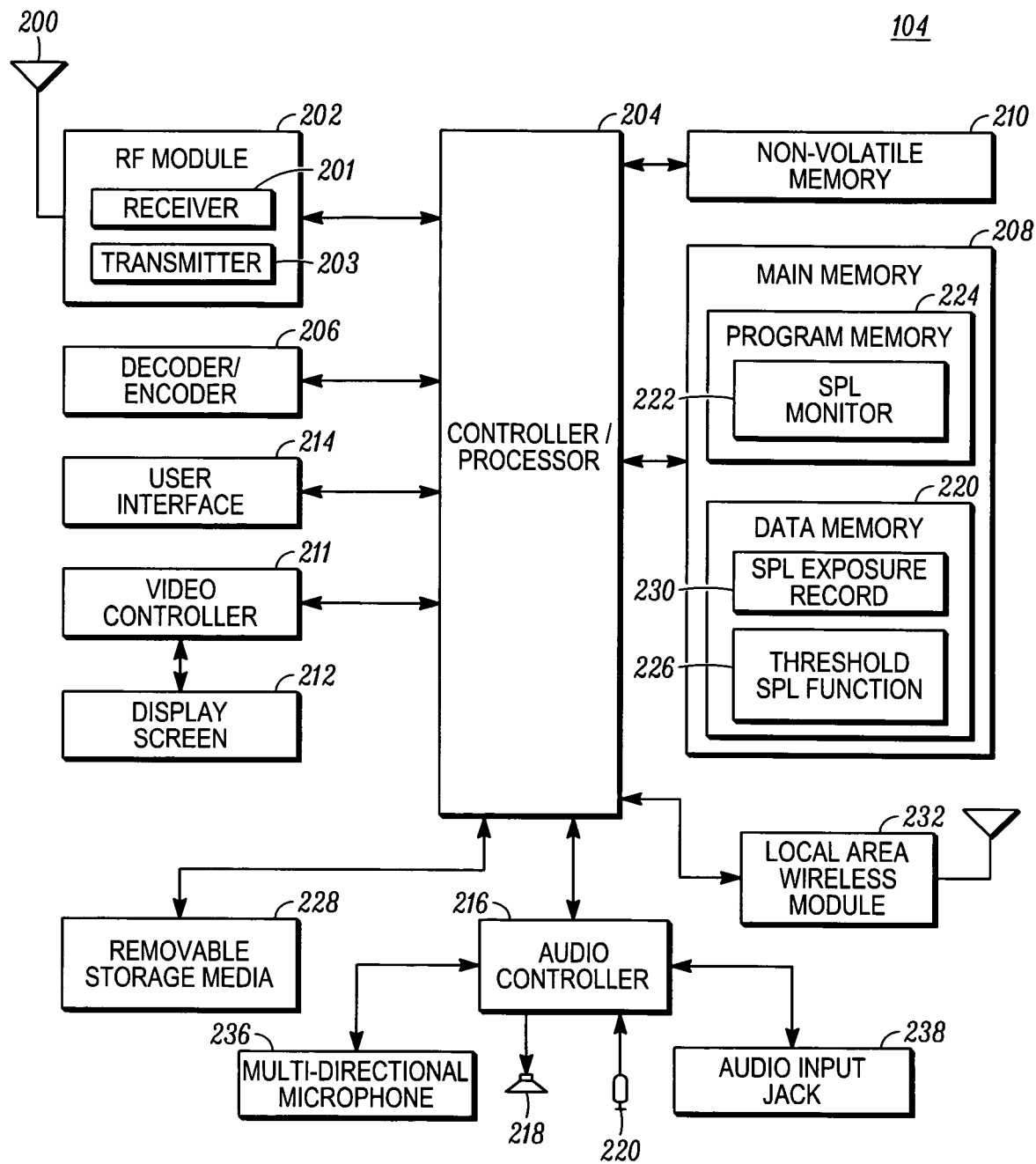
FIG. 2 is a block diagram illustrating one portable communication device of the system of FIG. 1, according to an exemplary embodiment of the present invention.

Referring now to FIG. 2, an electrical block diagram of an exemplary portable communication device 104, according to one embodiment of the present invention, is shown in more detail. The portable communication device 104 includes a controller/processor 204, which controls the operation of the device 104 according to computer instructions stored in program memory 224. The portable communication device 104 also includes a non-volatile memory 210 and a main memory 208. In one embodiment, the main memory 208 includes the program memory 224 and a data memory 220. An SPL monitor 222, which is discussed in greater detail below, is contained in the program memory 224 or other memory. In one embodiment, the data memory 220 contains a threshold SPL function 226 and an SPL exposure record 230. Additionally, or alternatively, the threshold SPL function 226 and the SPL exposure record 230 may be stored in a removable storage media 228 (e.g., a subscriber identity module (SIM) card, a memory stick, a USB flash drive, or any other portable data storage device), which functions under the command of the controller/processor 204.

The wireless communication device 104 transmits and receives signals for enabling wireless communication, such as for a cellular telephone, in a well-known manner. For example, when the wireless communication device 104 is in a "receive" mode, the controller/processor 204 operates an RF module 202, which couples an RF signal from the antenna 200 to a receiver 201 in a well known manner. The receiver 201 receives, converts, and demodulates the RF signal, providing a stream of data to the decoder/encoder module 206. The decoder/encoder module 206 decodes the received data, which the controller/processor 204 outputs to a user in a prescribed manner. For example, audio signals are routed through an audio controller 216 to a speaker 218 or other audio output device. Additionally, received textual, graphical, and/or image data is processed by a video controller 211 and presented to the user on a display screen 212. A receive operational sequence is normally under the control of the controller/processor 204 operating in accordance with computer instructions stored in program memory 224, as is well-known in the art.

In a "transmit" mode, the controller/processor 204, for example, responding to a user input (such as selection of one or more keys from a keypad or depression of a push-to-talk button), manages the audio controller 216 and couples electronic audio signals from an audio transducer of an internal microphone 220 to the decoder/encoder module 206, where the audio signals are converted to an encoded data stream for transmission. The controller/processor 204 enables the transmitter circuit 203, which modulates the encoded data onto an RF carrier signal, couples the signal through the antenna 200, and transmits the signal through the wireless communication system 100 in a manner well-known in the art.

Additionally, the audio controller 216 controls the volume level of the audio output through the speaker 218 according to parameters set by the user. The audio controller 216 may also measure the sound pressure level received by an audio input device, such as an internal microphone 220, a multi-directional microphone 236, a directional microphone (not shown), and/or an external microphone or SPL measuring device connected to the portable communication device 104 through an audio input jack 238.

In one embodiment, the portable communication device 104 also includes a local area wireless module 232 that facilitates short-range wireless communications with similarly enabled wireless devices, such as a wireless headset 102, a wireless earpiece (not shown), or a computer system 108. Signals received by the local area wireless module 232 are decoded by the encoder/decoder 206 according to applicable short-range communication standards (e.g., Bluetooth, Wi-Fi, Wi-MAX, Zigbee, UWB, etc.). Additionally, data to be transmitted using the local area wireless module 232 is first encoded by the encoder/decoder 206 according to the corresponding short-range standard. In an alternative embodiment, the portable communication device 104 may receive, via the local area wireless module 232, SPL exposure information for the user from another portable communication device (e.g., a wireless headset 102) performing the actual SPL monitoring in the vicinity of the portable communication device 104.

Figure 3:
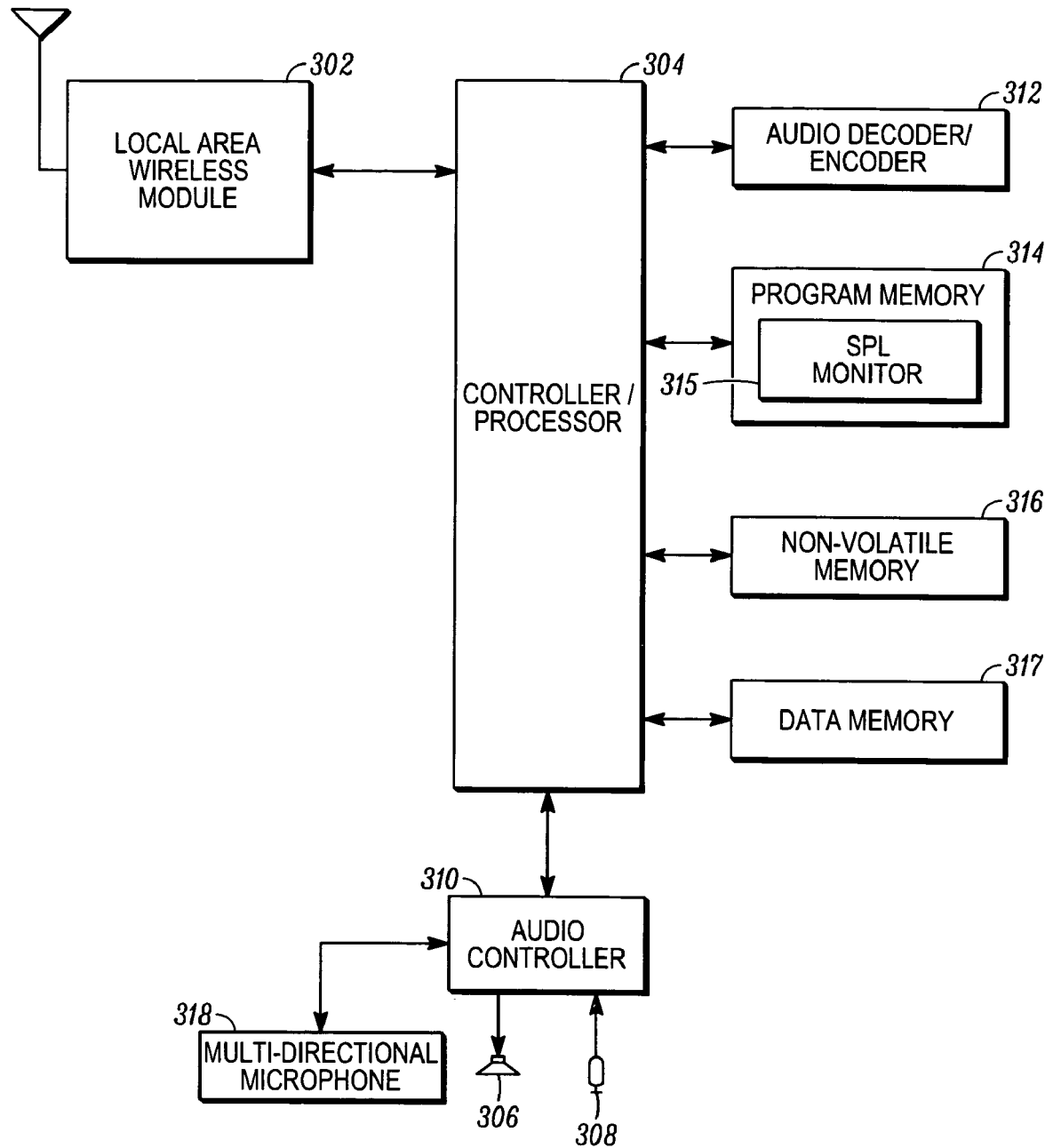
FIG. 3 is a block diagram illustrating another portable communication device of the system of FIG. 1, according to another exemplary embodiment of the present invention.

FIG. 3 depicts an electrical block diagram of another exemplary communication device 102 in accordance with one embodiment of the present invention. In this embodiment, the communication device 102 is a wireless headset or earpiece that functions in cooperation with the portable communication device 104. The communication device 102 includes a controller/processor 304, which controls the operation of the communication device 102 according to computer instructions stored in program memory 314. The program memory 314 may also store an SPL monitor 315, which is discussed in more detail below. The communication device 102 receives wireless data signals containing encoded audio information via a local area wireless module 302 or other short-range transceiver. The audio information is decoded by the audio decoder/encoder 312 in a manner well-known to those skilled in the art, and stored temporarily in non-volatile memory 316 before being routed to an audio controller 310 and output via a speaker 306. Likewise, audio signals coupled from an internal microphone 308, a directional microphone (not shown), and/or a multi-directional microphone 318 are transferred to the controller/processor 304 by the audio controller 310, and then encoded by the audio decoder/encoder 312 for transmission to the portable communication device 104, or other communication device in the local vicinity of the communication device 102, by the local area wireless module 302. Additionally, the audio controller 310 controls the volume of the audio output through the speaker 306 according to user set parameters. The audio controller 310 may also measure the SPL received by the internal microphone 308, the directional microphone (not shown), and/or the multi-directional microphone 318, and transfer the SPL information to the controller/processor 304 for transmission to the portable communication device 104 or another fixed or mobile communication device.

Figure 4:
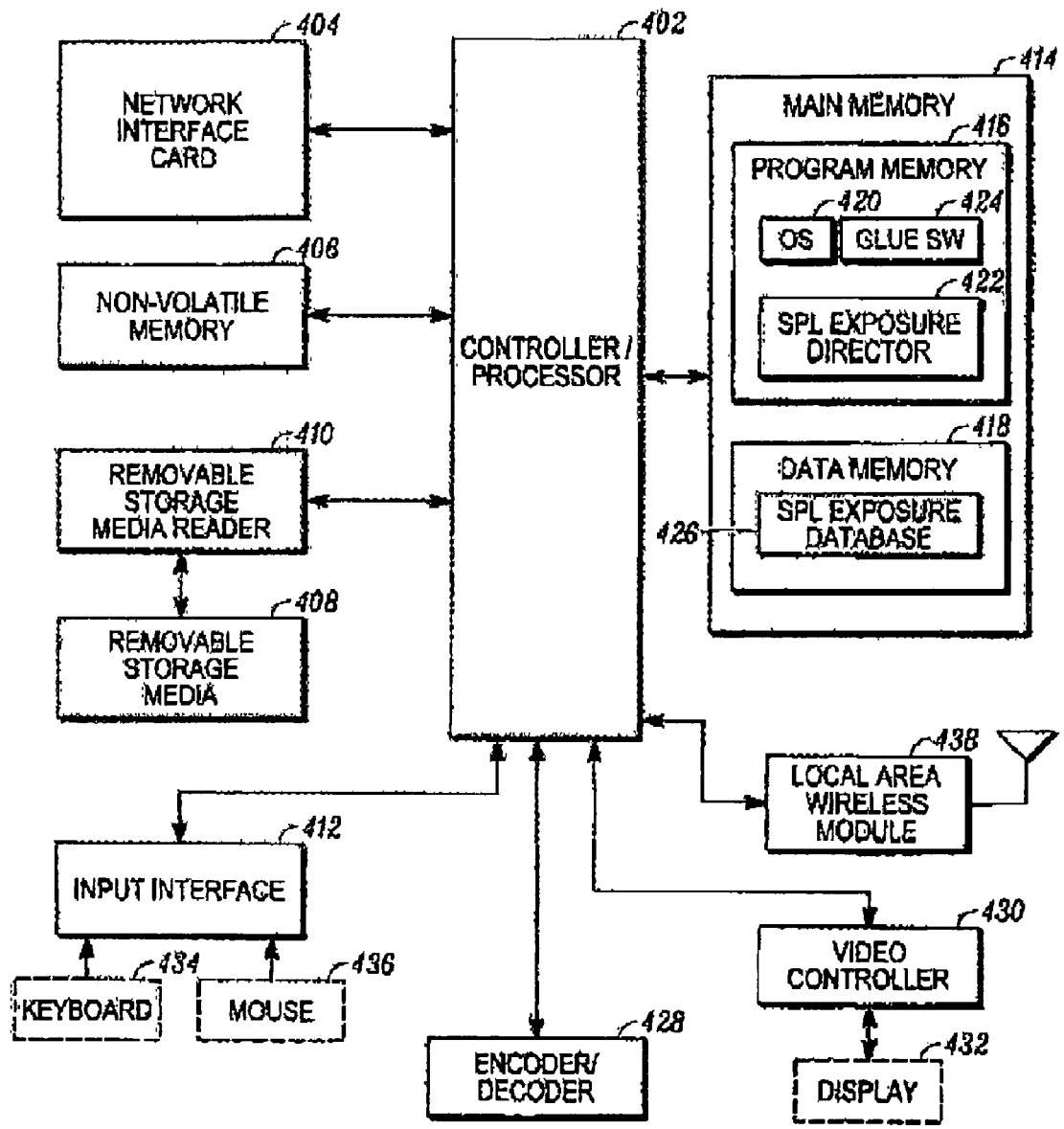
FIG. 4 is a block diagram illustrating a sound pressure level reporting server of the system of FIG. 1, according to an exemplary embodiment of the present invention.

Referring now to FIG. 4, an electrical block diagram of an exemplary SPL tracking server 112 is shown in more detail, according to one embodiment of the present invention. The depicted SPL tracking server 112 includes a controller/processor 402, which processes instructions, performs calculations, and controls the flow of information through the SPL tracking server 112 according to computer instructions stored in program memory 416.

The controller/processor 402 is communicatively coupled to a non-volatile memory 406 and a main memory 414. In one embodiment, the main memory 414 includes the program memory 416 and a data memory 418. The program memory 416 contains a variety of software components, including, in one embodiment, an SPL exposure director 422, an operating system platform 420, and glue software 424. The operating system platform 420 manages resources, such as the data stored in the data memory 418, schedules tasks, and processes the operation of the SPL exposure director 422, as discussed in greater detail below. The operating system platform 420 also manages an input interface 412 and a network interface card 404. The input interface 412 receives inputs from an optional keypad or keyboard 434, mouse 436, touch screen, or other input device. The network interface card 404 communicates with other devices through the LAN access point 110. Additionally, the operating system platform 420 further manages many other basic tasks of the server 112 in a manner well known to those of ordinary skill in the art.

In one embodiment, the glue software 424 includes drivers, stacks, and low level application programming interfaces (APIs). The glue software 424 provides basic functional components for use by the operating system platform 420 and by compatible applications that run on the operating system platform 420 for managing communication resources and processes in the SPL tracking server 112.

The data memory 418, or another memory component of the server 112, contains an SPL exposure database 426. The SPL exposure database 426 is a database that contains SPL records for at least one communication device user. Each SPL record contains a user identifier corresponding to a given user, a communication device identifier, an SPL measurement, and a corresponding date and time. The user identifier may contain a user name, a user identification number, a birth date, or any other information used to identify a specific user. The communication device identifier is at least associated with a manufacturer of the communication device and, more preferably, is further associated with a model or serial number of the communication device.

Additionally, or alternatively, the SPL exposure database 426 may be stored on a removable storage media 408 (e.g., a memory stick, a USB flash drive, a compact disc (CD), a digital video disk (DVD), a floppy disk, or any other portable data storage device), which is read by a removable storage media reader 410 functioning under the command of the controller/processor 402. Alternatively, the SPL exposure database 426 may be located on a remote server accessed through the WAN 120, or in any other memory that is accessible by the SPL tracking server 112.

In one embodiment, the SPL tracking server 112 also includes a local area wireless module 438 to facilitate wireless communication with other wireless enabled communication devices using short-range communication standards (e.g., Bluetooth, IrDA, Wi-Fi, Wi-MAX, Zigbee, UWB, etc.). Signals received by the local area wireless module 438 are decoded by the encoder/decoder 428 according to the corresponding short-range communication protocol. Additionally, data to be transmitted using the local area wireless module 438 is first encoded by the encoder/decoder 428 according to the same short-range communication protocol.

If text, graphics, or video is to be optionally displayed to a user of the server 112, video output, in one embodiment, is controlled by a video controller 430 which processes video information and displays the information to a local or remote display screen 432 (e.g., monitor).

Figure 5:
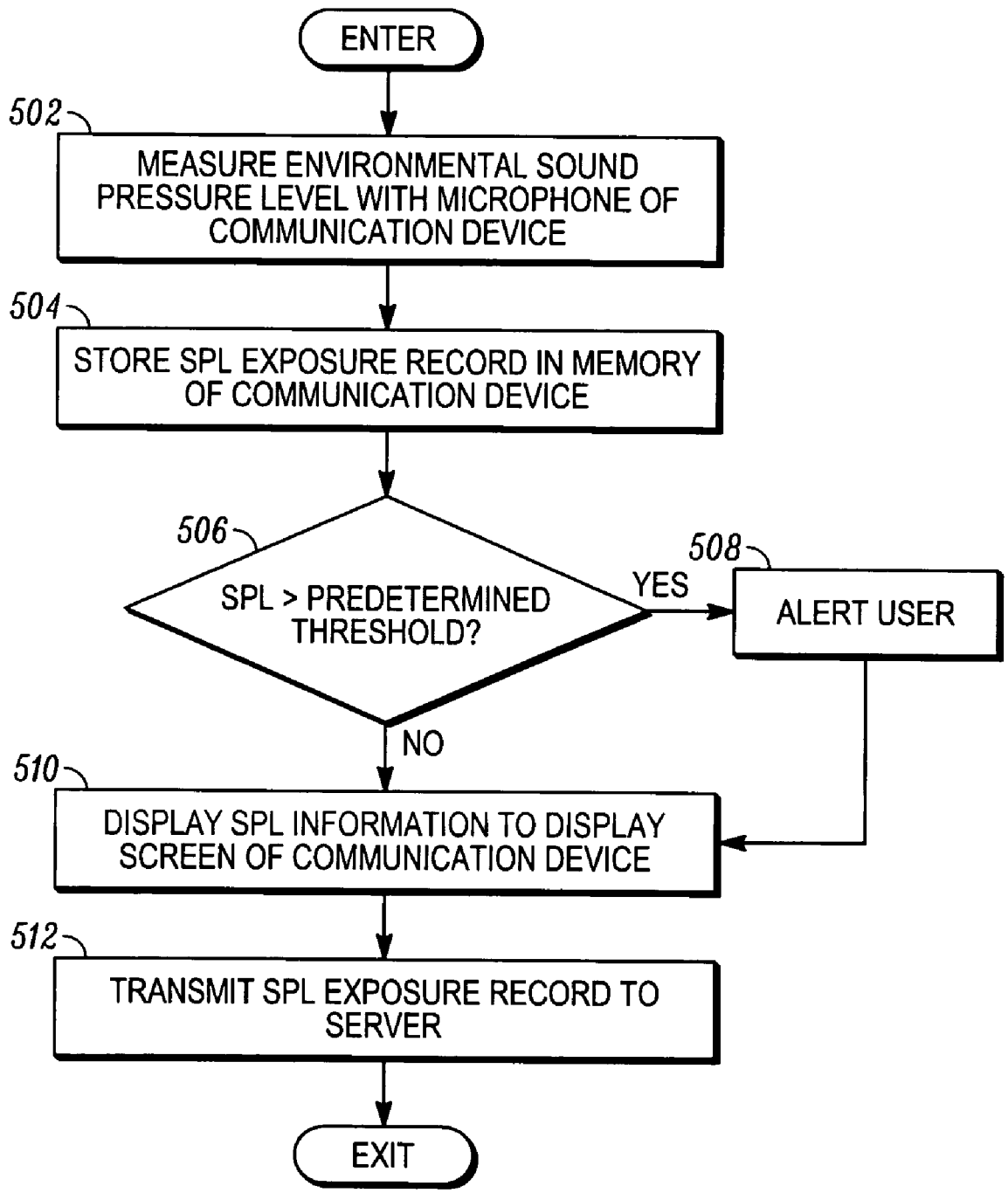
FIG. 5 is a logic flow diagram illustrating steps executed by a communication device to implement a method for monitoring and reporting SPL exposure for a user of the communication device in accordance with an exemplary embodiment of the present invention.

FIG. 5 illustrates an exemplary logic flow diagram 500 executed by a communication device 104 to implement a method for monitoring and reporting SPL exposure for a user of the communication device 104, in accordance with one embodiment of the present invention. The user of the communication device is generally located in an area 105 exposed to ambient environmental noise 103. The communication device 104 either contains an internal microphone 220 (e.g., when the communication device is a portable communication device), or is otherwise connected to an external microphone, which is typically used to capture voice signals from the user for normal voice communications. An embodiment of the present invention exploits the presence of the microphone 220 (whether internal or external) to monitor and record surrounding environmental SPL information without additional expense. The remainder of the discussion of FIG. 5 will focus on an embodiment in which the communication device is a portable communication device 104.

At step 502, the internal microphone 220 of the portable communication device 104 captures ambient noise, and the audio controller 216 measures the SPL of the captured noise. In one embodiment, the internal microphone 220 serves the dual purposes of capturing environmental noise for SPL measurement as well as coupling voice signals to the audio controller 216 for transmission in a voice call or other communication. Additionally, the microphone 220 may measure noise levels across the entire noise spectrum (e.g., 20 Hz to 20 kHz) and is not limited to measuring noise having a frequency range within the audible range of human hearing.

The SPL measurement may be taken randomly throughout the day, at predetermined intervals, continuously, or upon user request. In the event that the internal microphone 220 of the portable communication device 104 is being used for a voice call or push-to-talk functions at a time scheduled for an environmental noise measurement, the SPL monitor 222 will, in one embodiment, delay the scheduled measurement until after the call is completed. In an alternative embodiment, the SPL may be captured using a multi-directional microphone 236 or a directional microphone (not shown) dedicated to capturing environmental noise, or with an external SPL measuring device communicatively coupled to the audio controller 216 via an external audio input jack 238.

At step 504, the SPL monitor 224 stores the measured SPL information, along with the corresponding date and time of the measurement, in a memory of the portable communication device 104 as an SPL exposure record 230. Each SPL exposure record 230 may further contain a user identifier for the given user and a communication device identifier unique to the portable communication device 104. The user identifier may contain a user name, an identification number, a birth date, or any other information used to identify a given user. The SPL exposure record 230 may be stored for future retrieval in the data memory 220 of the portable communication device 104, or temporarily in non-volatile memory 210 for transmission to other communication devices or the SPL tracking server 112. The SPL monitor 222 compares the measured SPL to a predetermined threshold, at step 506. If the measured SPL exceeds the threshold, the SPL monitor 222 alerts the user of the dangerous condition, at step 508. The alert may include audible, visual, or haptic (e.g., vibration) feedback.

Figure 6:
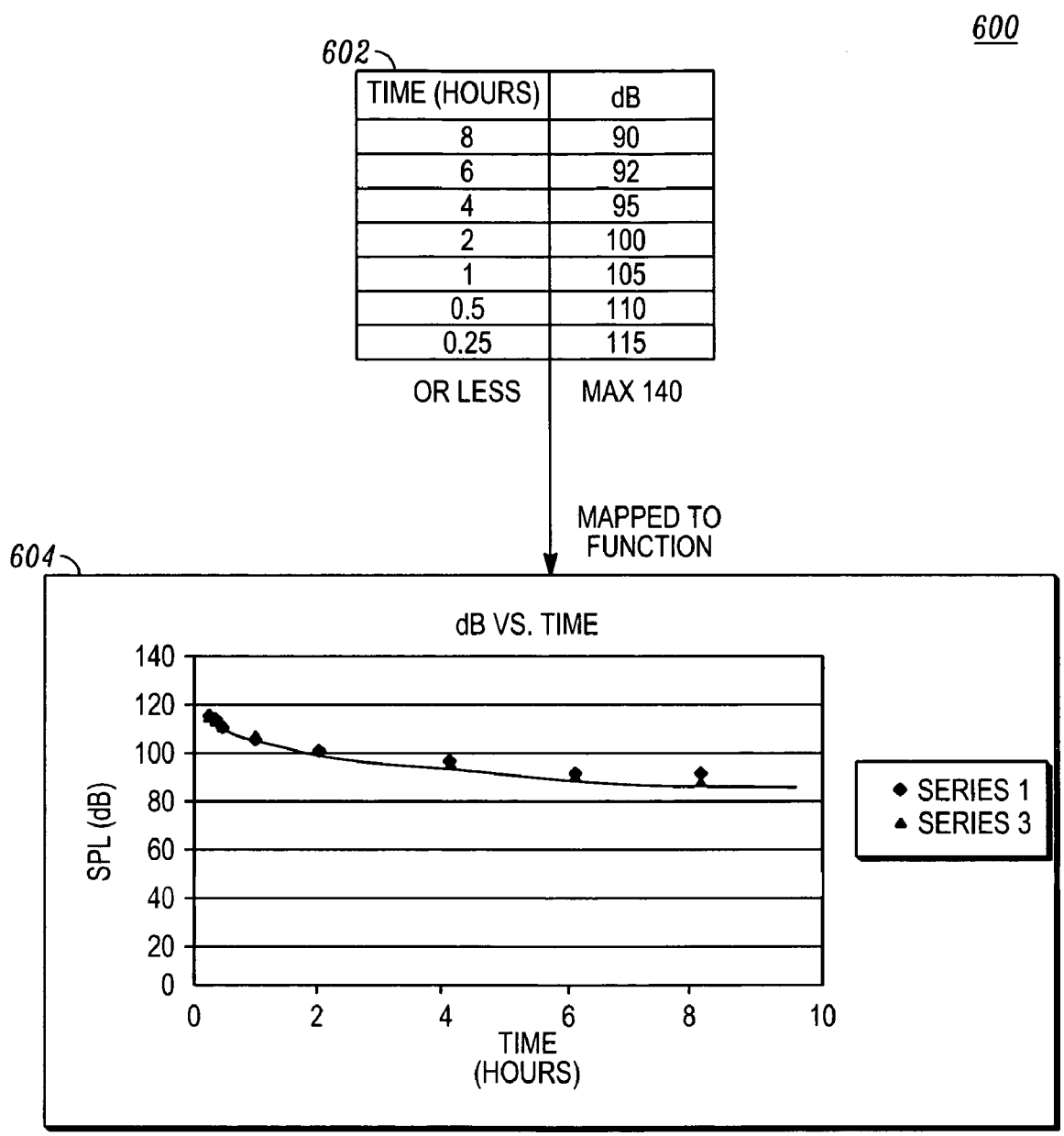
FIG. 6 is an exemplary recommended exposure time by intensity of SPL mapped to an exposure level versus time function, in accordance with one embodiment of the present invention.

The recommended exposure threshold may be set according to regulatory guidelines recommended by governmental agencies (e.g., OSHA, NIOSHA, U.S. Dept. of Health and Human Services, etc.) or may be adjusted to more stringent standards. In one embodiment, recommended exposure standards are mapped to a function of allowable SPL exposure versus time. For example, assuming for purposes of illustration that a workplace complies with employee SPL exposure limits determined according to OSHA (41 C.F.R. §50-204, 10), as illustrated in table 602 of FIG. 6, the data in table 602 is correlated using standard curve-fitting techniques resulting in an exemplary function:

$$t = \frac{\ln(dB/A)}{-\lambda} \text{ or } dB = Ae^{-\lambda t}$$

where A=110 and λ=0.0301. Results of this mapping are shown in FIG. 6 where the OSHA guidelines, as illustrated in the table 602, have been fitted to graph 604. By changing the value of A, the curve may be shifted up for a more lenient standard or down for a more stringent requirement, thereby allowing the recommended exposure level to be set on an individual user basis. Function mapping of recommended SPL guidelines permits more stringent requirements than OSHA guidelines to be established for a user that is particularly vulnerable to hearing loss (e.g., someone who has previously suffered hearing damage). Although the above example depicts a function resulting from curve-fitting the OSHA standards, the SPL threshold function may be determined by mapping any profile or set of standards to any function F(x), where F(x) is preceded by a constant to allow for scalability to facilitate more stringent or lenient requirements on a user-by-user (or group-by-group) basis.

As another example, the curve depicted in graph 604 may be shifted upwards if the user indicates that he/she is wearing protective equipment such as ear plugs, ear muffs, or the like. Each protective device has a standard dB reduction factor that may be taken into consideration when calculating the threshold limitation. For instance, a set of ear plugs may dampen the SPL by 15-20 dB. Additionally, the set threshold may be an instantaneous point (e.g., the noise level has reached an unacceptable level or has remained at or above a certain decibel level for an unacceptable amount of time), an area under the curve (e.g., the cumulative effect of the noise has reached an unacceptable level), or an average SPL exposure value.

Figure 7:
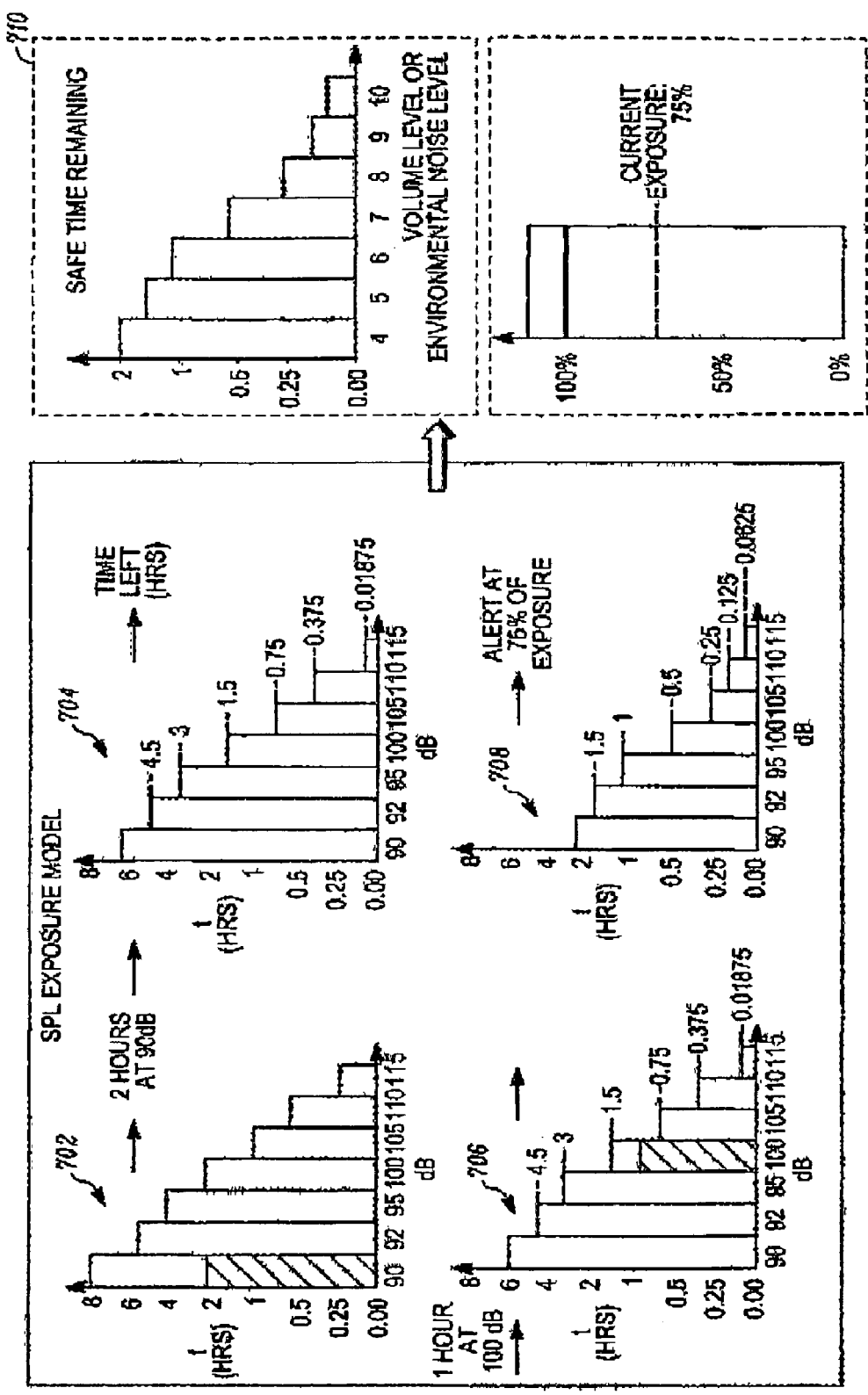
FIG. 7 is an exemplary sound pressure level model as visualized on a display screen of a communication device, in accordance with one embodiment of the present invention.

Returning to FIG. 5, at step 510, the SPL monitor 222 displays a visual representation of the user's SPL exposure record to the user on the display screen 212 of the communication device 104 in the event that the SPL is below the threshold. FIG. 7 depicts exemplary visual representations of exposure levels for one SPL model according to the OSHA recommended guidelines illustrated in FIG. 6. Graph 702 represents a user being exposed to an SPL of 90 dB for 2 hours. Because the maximum recommended exposure time for sounds at the 90 dB level is 8 hours, the total recommended SPL exposure for this user is now reduced by 25%, as shown in graph 704. Suppose the same user is subsequently exposed to an SPL of 100 dB for one hour, as shown in graph 706. Because the total exposure level for this user has previously been reduced, his/her recommended exposure time at 100 dB is now only 1.5 hours (instead of two hours had the user not been exposed to an SPL of 90 dB for two hours). The one hour exposure at 100 dB further reduces this user's total exposure time by another two-thirds, as indicated in graph 708. If the predetermined threshold is set at a 75% exposure level, the user will be alerted at this point by a visual representation of the remaining exposure time or his/her present exposure level.

In an alternative embodiment, the SPL model is determined in a less stringent manner. In this embodiment, the total SPL exposure is expressed as the function $$F = \sum \frac{C}{T},$$

where C=time exposed at a certain dB level, and T=Time allowed. To illustrate this function, it is assumed that a user is exposed to the same levels as those indicated in the example discussed above with respect to FIG. 7. First, the user is exposed to an SPL of 90 dB for 2 hours. Because the total recommended exposure level at 90 dB is 8 hours, the user has been exposed to a 90 dB sound for twenty-five percent (C/T=2/8) of the allowed exposure time for the 90 dB level. Next, the user is exposed to 100 dB for 1 hour. The allowed exposure time at 100 dB is 2 hours, so the user has been exposed to a 100 dB sound for 50 percent (C/T=1/2) of the allowed time. Thus, the total exposure time for the user is 75 percent (i.e., 25±50).

An exemplary visual representation 710 may be displayed to the user indicating a measurement of the exposure time remaining to safely remain in the current environment. An alternative visual representation 712 of the user's SPL exposure remaining may depict the SPL exposure as a bar graph, color-coded with incremental levels from green to red to illustrate a safe to harmful SPL exposure range, along with an indicator of the user's present condition. Any additional variations of visual representations of the user's SPL exposure level are within the scope of the present invention. Additionally, the visual representation may include representations of the SPL exposure level for the given user with and/or without protective hearing equipment.

The SPL exposure record 230 containing the SPL measurement information, the corresponding date and time, and, optionally, a user identifier (e.g., user name, identification number, birth date, or any other information used to identify a given user) and/or the communication device identifier, is transmitted to an SPL tracking server 112, at step 512, for remote monitoring or historical collection. In this manner, employers, users, parents, physicians, and even OSHA auditors can access the user sound exposure levels for a given user.

In another embodiment of the present invention, the effects of a second communication device 102, such as a wired or wireless headset, headphones, earphones or other audio device that couples audio signals directly to the user's ear, are also taken into consideration. Many audio devices today, such as Bluetooth enabled headsets or other audio players, contain audio output transducers designed to fit inside the user's ear or are positioned on the user's ear in such a manner as to couple sound directly into the user's ear. Many users, especially teenagers and young children, are uninformed or unaware of the dangerous effects that long term exposure to loud noise may have on one's hearing. Additionally, sound from an audio device, when combined with high environmental noise, may be particularly (and often unnoticeably) damage inducing. Therefore, an embodiment of the present invention monitors both the sound pressure level of the environmental noise and that of the actual audio output device, to provide a cumulative SPL exposure record 230.

Figure 8:
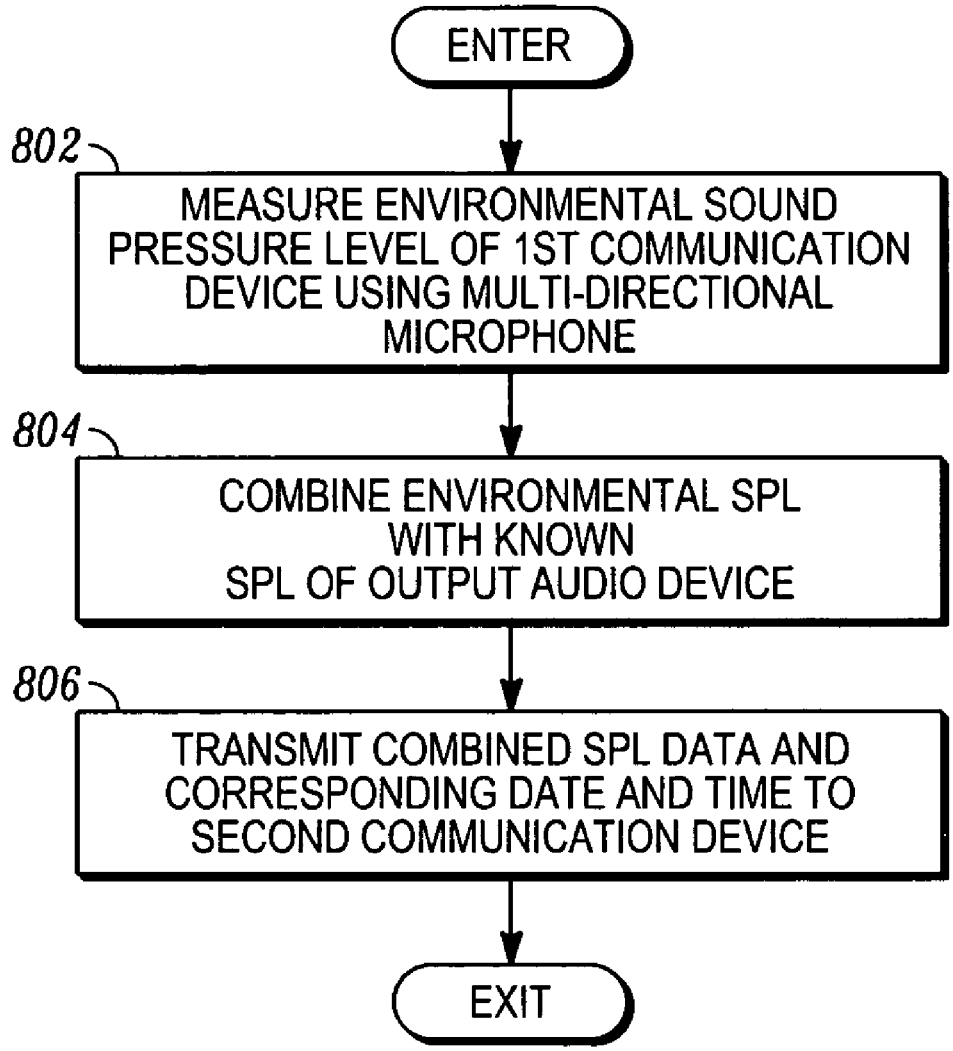
FIGS. 8-10 are logic flow diagrams of various steps executed by a communication device and/or an SPL tracking server to implement a method for monitoring and reporting SPL exposure for a user of a communication device, in accordance with exemplary embodiments of the present invention.

As illustrated in the exemplary logic flow diagram 800 of FIG. 8, the audio controller 310 of a first communication device 102 measures the environmental sound pressure level surrounding the device 102 using a microphone located on or in the first communication device 102. The microphone may be an internal microphone 308 normally used for communication, or may be a directional or multi-directional microphone 318 used exclusively to monitor environmental sound pressure levels. The first communication device 102 also contains an audio output device 306, such as a speaker, that is preferably directly coupled to the user's ear. For example, the first wireless device 102 may be a wireless headset having speakers which attach directly to the user's ear or fit inside the user's ear.

The measured environmental SPL information is combined with a known SPL data (e.g., volume level) of the audio output device 306 for a total sound pressure level exposure, at step 804. SPL data for the audio output device 306 is stored in data memory 317 of the wireless communication device 102. The SPL data corresponds to an output volume level for the audio output device 306 and may be measured experimentally at the time of original manufacturing for each unique wireless communication device 102, or may be determined from a sampling of similar devices and stored as a default value for each output volume level. The measured environmental SPL data and the known SPL data are combined according to a weighted sum to form a cumulative user sound exposure level, wherein the weights for each measurement are dependent upon the type of wireless communication device 102. At step 806, the combined SPL data, along with a corresponding date and time, are transmitted to a second communication device 104 (e.g., a cellular phone or other communication device with which the first communication device is communicating) for further processing.

Figure 9:
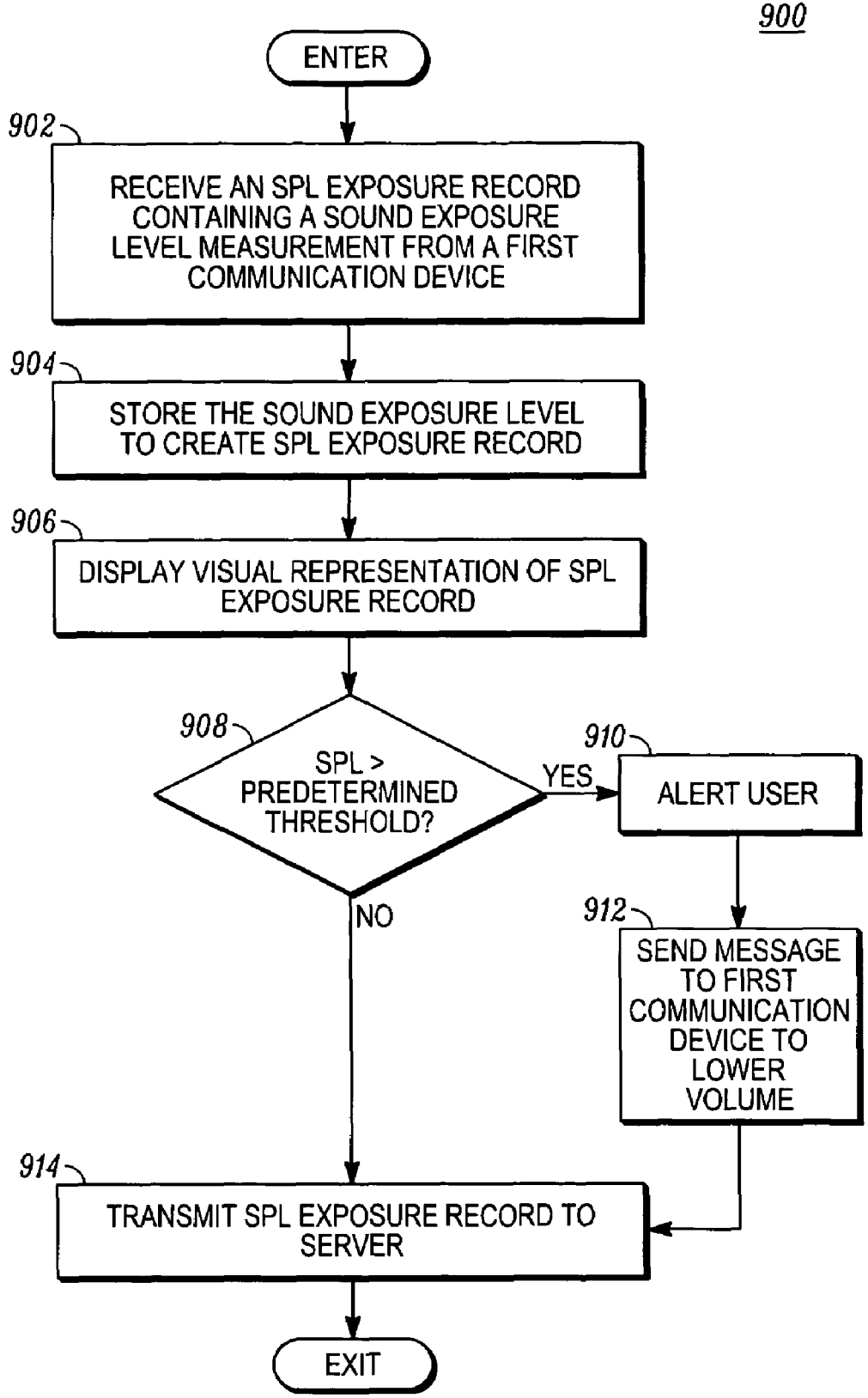

FIG. 9 illustrates an exemplary logic flow diagram 900 executed by one portable communication device 104, working in conjunction with another portable communication device 102, in another exemplary embodiment of the present invention. For example, as depicted in FIG. 1, portable communication device 104 (e.g., a cellular phone) is in communication with portable communication device 102 (e.g., a wireless headset). At step 902, portable communication device 104 receives an SPL exposure record 230 containing a combined SPL exposure measurement, a corresponding date and time, and an optional user identifier and/or communication device identifier from portable communication device 102. The SPL exposure record 230 is stored in a data memory 220 of portable communication device 104, at step 904. The SPL exposure record 230 is then displayed to the user as a visual representation on the display screen 212 of portable communication device 104, at step 906. For example, one exemplary visual representation 710, as shown in FIG. 7, may be displayed to the user indicating a measurement of the amount of exposure time left for the user to safely remain in the current environment or operate an audio output device at a certain volume level. Alternatively, another visual representation 712 may indicate the SPL exposure as a bar graph, color-coded with incremental levels from, for example, green to red to illustrate a safe to harmful SPL exposure range, along with an indicator of the user's present condition.

The SPL monitor 222 compares the combined SPL exposure measurement to a predetermined threshold, at step 908, and if the measured level exceeds the threshold, the SPL monitor 222 alerts the user of the dangerous condition, at step 910. The SPL monitor 222 may then transmit a message to portable communication device 102 containing instructions to automatically lower the volume of the audio output device 306 to an acceptable sound pressure level, at step 912. Finally, the SPL exposure record 230 containing the combined SPL exposure measurement is transmitted to an SPL tracking server 112, at step 914, for remote monitoring or historical collection.

Figure 10:
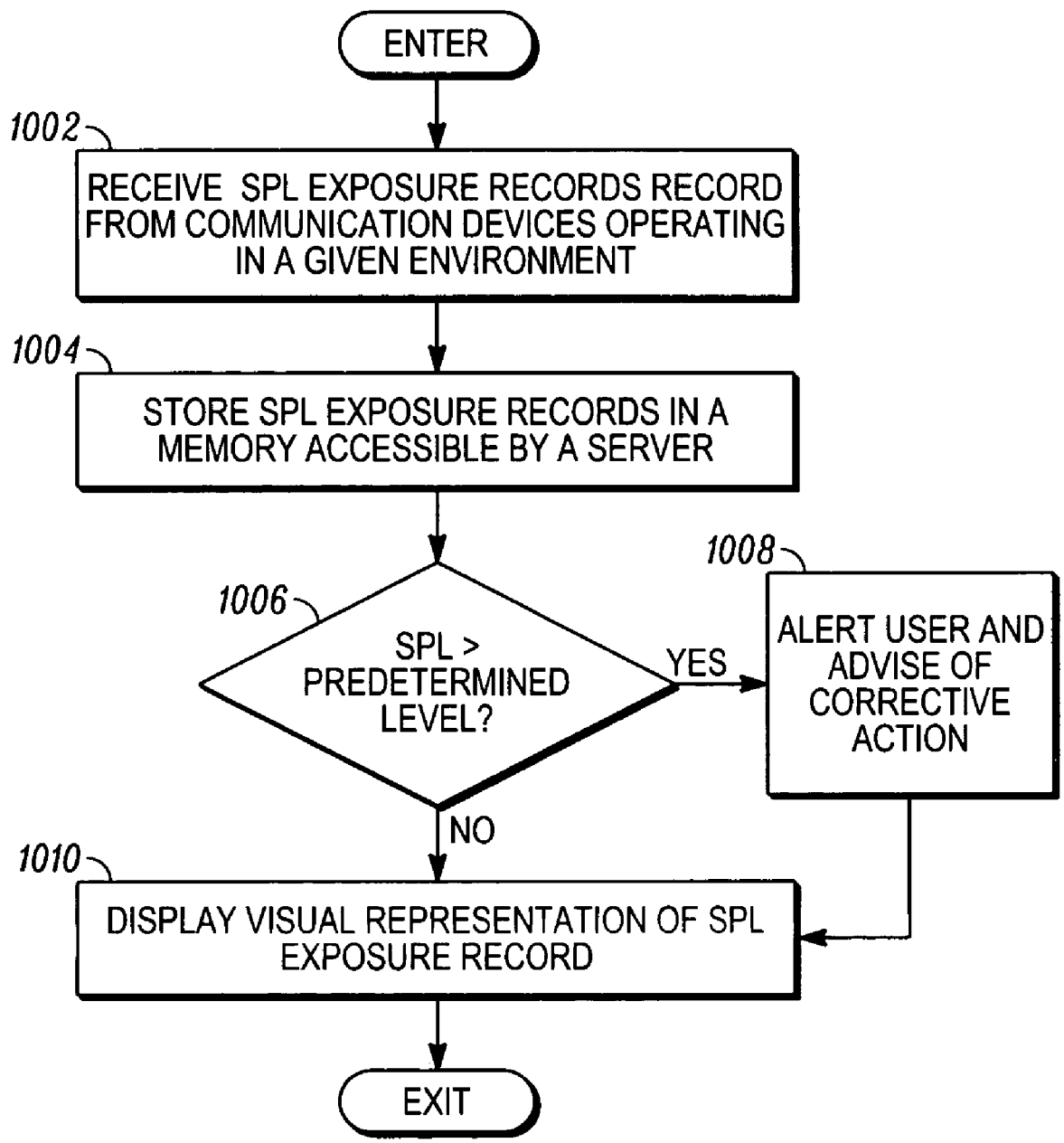

FIG. 10 illustrates an exemplary logic flow diagram 1000 executed by the SPL tracking server 112 implementing steps of a method for monitoring and reporting SPL exposure for a user of a communication device 104, according to an exemplary embodiment of the present invention. Beginning in step 1002, the SPL tracking server 112 receives an SPL exposure record 230 from a wireless communication device 104 operating for a given user. The SPL exposure record 230 contains, in one embodiment, an SPL exposure measurement and a corresponding date and time for the given user. Additionally, the SPL exposure record 230 may include a user identifier (e.g., user name, user identification number, birth date, or any other identification information) and a communication device indicator identifying the portable communication device 104, as well as the specific communication device monitoring the environmental SPL. The SPL exposure director 422 stores the SPL exposure record 230 in an SPL exposure database 426 located in the data memory 418 of the SPL tracking server 112 or in any other memory accessible by the server 112, at step 1004. The SPL exposure director 422 compares the SPL exposure measurement to a predetermined threshold for the given user in a manner described above, with respect to FIG. 6, at step 1006. If the SPL exposure measurement exceeds the predetermined threshold, then, at step 1008, the SPL exposure director 422 notifies the user of the dangerous or harmful condition and may advise the user to take corrective action. For example, the corrective action may entail further training and education in the use and importance of full time use of hearing protection, seeking the use of hearing protectors better suited to the environment and the individual, and using administrative controls to reduce the exposure time for the given user.

In an alternative embodiment, because the SPL tracking server 112 has access to SPL information received from a plurality of communication device users, corrective action may include advising the user of the portable communication device 104 to move to a location where the SPL is at a lower level (e.g., a location where the SPL measurements received from a different portable communication device are lower). To accommodate this embodiment, the SPL exposure record 230 from each communication device may further include a GPS (or other) location of the communication device.

The SPL exposure director 422 may send a visual representation of the SPL exposure record 230, as well as any corrective action, to the display screen 212 of the communication device 104, at step 1010. Alternatively or additionally, the SPL exposure director 422 may transmit the information to a display screen 432 of a remote terminal (e.g., a computer system in communication with the SPL tracking server 112). The SPL exposure director 422 may also send an audible alert, a visual alert, and/or a haptic alert (such as vibration) to the communication device 104. In an alternative embodiment, the SPL exposure director 422 may transmit a message to the communication device 104 instructing the communication device 104 to automatically lower the SPL output of the audio output device 306 (e.g., lower the output volume from the audio transducer).

In another embodiment, the SPL tracking server 112 may store SPL exposure records received from a plurality of communication devices in an SPL exposure database located in a memory accessible to the server 112. Each SPL exposure record contains at least one SPL measurement, the corresponding date and time, the user identifier, and the communication device identifier. A user may then view SPL information contained in the SPL exposure records according to a particular user identifier or communication device. For example, and not by way of limitation, a parent may track the total SPL exposure for his or her child even though the child may use several different communication devices (e.g., a cellular phone, a wireless headset, and an audio player). As another example, it is assumed for illustrative purposes only that an organization owns or leases several communication devices (e.g., cellular phones, pagers, two-way radios, etc.), but no worker, employee, or other user is assigned a communication device on a permanent basis. Instead, each user picks up a communication device 104 from a pool of devices for use while the user is on duty. When the worker receives the communication device each day, he or she logs on to the device (e.g., enters a user name directly into the device using a user interface, swipes an ID badge, communicates with the device using an RFID, or enters a user ID), which stores the new user identifier (e.g., user name or other identifier) in the data memory 220 of the communication device 104. Thus, when the communication device 104 next transmits monitored SPL information, the new SPL information is associated with the new user.

In another embodiment, the communication device 104 may periodically test and record the hearing capabilities of the user and save the test results as an audiogram. The communication device 104 tests the user's hearing by requiring the user to respond when he/she hears a test tone played at a set frequency and volume. The hearing information for the user may be archived in the SPL exposure database 426 and tracked over time for historical purposes. Additionally, by tracking the hearing information over time, different SPL thresholds maybe set using different functions for a given user depending upon his/her individual hearing characteristics as established based on historical audiograms. For example, if an audiogram indicates that the user has experienced a significant hearing loss since his or her previous test, the user may need to seek medical attention and/or use additional hearing protection.

In a further embodiment, a parent or employer may set an SPL threshold level for a given user via the SPL exposure director 422 of the SPL tracking server 112 or the SPL monitor 222, 315 of the portable communication device 102, 104. Additionally, a parent, employer, or other administrator may request to be notified by the communication device 102, 104 or the SPL tracking server 112 in the event that the SPL exposure measurement for a given user exceeds the predetermined threshold.

In an alternative embodiment, peer-to-peer communication between communication devices in a given area allows a user of one communication device (e.g., a portable communication device), located in an area measuring a high SPL, to query other devices within a short-range communication area for their present SPL conditions. In this manner, the user may decide to relocate to a quieter environment. For example, suppose a user was attending a music concert and was seated very close to the speakers. The portable communication device 104 may automatically or responsive to user input, send a query to nearby devices requesting SPL measurements. The portable communication device 104 then displays SPL measurements received from other devices to the display screen 212 of the portable communication device 104. In the event that one of the received measurements is less than the present SPL measurement of the portable communication device 104, the portable communication device 104 may request location information from the device having a lower SPL. The location information may be provided by any active wireless positioning system (e.g., Global Positioning System (GPS), Wi-Fi, etc.) in communication with the lower SPL device. Alternatively, a request for location information may be transmitted with the request for the original SPL information. Upon receiving or otherwise determining a location having a lower SPL, the user may move to the quieter location.

Finally, by collecting SPL data from multiple communication devices in a given area, the SPL exposure director 422 of the SPL tracking server 112 may easily pinpoint and quickly resolve any deficiencies an employer may have for a given work environment. Early detection of problem areas previously unknown will prevent potential hearing loss problems for the entire workforce.

As described above, the present invention encompasses a method for monitoring and reporting sound pressure level exposure for a user of a communication device. With this invention, autonomous monitoring of a sound pressure level exposure for a given user helps to prevent unintended temporary or permanent hearing damage and avoids the expense and inconvenience of requiring dedicated equipment. The communication device monitors ambient environmental noise exposure, as well as sound pressure levels of output audio devices, and determines whether the user is in a potentially harmful situation for hearing loss. Determination of the potential for hearing loss is based on recommended exposure guidelines, as well as individual user characteristics, including the use of protective equipment. Further, an embodiment of the present invention allows a parent or administrator to closely monitor sound pressure level exposure for an individual and determine allowed thresholds for that user.

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention.

Benefits, other advantages, and solutions to problems have been described above with regard to specific embodiments of the present invention. However, the benefits, advantages, solutions to problems, and any element(s) that may cause or result in such benefits, advantages, or solutions to become more pronounced are not to be construed as a critical, required, or essential feature or element of any or all the claims. The invention is defined solely by the appended claims including any amendments made during the tendency of this application and all equivalents of those claims as issued.

What is claimed:

1. A method for monitoring and reporting sound pressure level exposure for a user of a first portable communication device, the first portable communication device being operable together with a second portable communication device to provide communication service to the user, the method comprising:
    receiving, by the first portable communication device, a sound pressure level (SPL) exposure record from the second portable communication device, the SPL exposure record containing a combined SPL exposure measurement representing a combination of a measured SPL for an environment surrounding the second portable communication device and a known SPL for at least one output audio transducer of the second portable communication device;
    comparing, by the first portable communication device, the combined SPL exposure measurement to a predetermined threshold; and
    in the event that the SPL exposure measurement exceeds the predetermined threshold, transmitting, by the first portable communication device, a message to the second portable communication device, the message instructing the second portable communication device to reduce a volume level of the at least one output audio transducer.

2. The method of claim 1, further comprising:
    storing at least the SPL exposure record in a memory of the first communication device; and
    displaying a visual representation of the SPL exposure record on a display screen of the first portable communication device.

3. The method of claim 1, further comprising:
    alerting the user in the event that the SPL exposure measurement exceeds the predetermined threshold.

4. The method of claim 1, wherein the predetermined threshold is a function of allowable SPL versus time and wherein the function is customized for the user of the first portable communication device.

5. The method of claim 1, wherein the SPL exposure record is received from the second portable communication device using a short-range wireless protocol.

6. The method of claim 1, wherein the first portable communication device is a wireless telephone and the second portable communication device is a wireless audio device for use in cooperation with the first portable communication device.

7. The method of claim 1, wherein the combined SPL exposure measurement is a weighted sum of the measured SPL for the environment surrounding the second portable communication device and the known SPL for the at least one output audio transducer of the second portable communication device.

8. A method for monitoring and reporting sound pressure level exposure for a user of a portable communication device, the portable communication device providing capability for engaging in phone calls, the method comprising:
scheduling, by the portable communication device, a time at which to perform a sound pressure level (SPL) measurement for an environment surrounding the portable communication device;
determining, by the portable communication device, whether the portable communication device is engaged in a phone call at the time at which the SPL measurement is scheduled;
delaying, by the portable communication device, the SPL measurement until a time after the phone call is completed in the event that the portable communication device is engaged in a phone call at the time at which the SPL measurement is scheduled;
performing, by the portable communication device, the SPL measurement after the phone call is completed;
storing at least the SPL measurement in a memory of the portable communication device to produce a record; and
displaying a visual representation of the record on a display screen of the portable communication device.

9. A method for monitoring and reporting sound pressure level exposure for a user of a first portable communication device, the first portable communication device being operable together with a second portable communication device to provide communication service to the user, the method comprising:
measuring, by the first portable communication device, a sound pressure level of an environment surrounding the first portable communication device at a scheduled time to produce a measurement;
combining, by the first portable communication device, the measurement with a known sound pressure level for at least one output audio transducer of the first portable communication device to produce a user sound exposure level;
storing the user sound exposure level in a memory of the first portable communication device to produce a record;
transmitting the record to the second portable communication device;
subsequent to transmission of the record, receiving, by the first portable communication device, a message from the second portable communication device, the message instructing the first portable communication device to reduce a volume level of the at least one output audio transducer, and
reducing, by the first portable communication device, the volume level of the at least one output audio transducer responsive to the message.

10. The method of claim 9, wherein the step of measuring a sound pressure level comprises measuring the sound pressure level using at least one of a microphone located internal to the first portable communication device, a multi-directional microphone located on the first portable communication device, and a directional microphone located on the first portable communication device.

11. The method of claim 9, wherein the second portable communication device is a wireless telephone and the first portable communication device is a wireless audio device for use in cooperation with the second portable communication device.

12. The method of claim 9, further comprising:
determining that the first portable communication device is engaged in a phone call; and
delaying the scheduled time at which the sound pressure level until is measured until a time after the phone call is completed.

13. The method of claim 9, wherein the combining step comprises:
calculating a weighted sum of the measurement and the known sound pressure level for the at least one output audio transducer of the first portable communication device to produce the user sound exposure level.

14. The method of claim 9, wherein the record is transmitted to the second portable communication device using a short-range wireless protocol and wherein the message is received from the second portable communication device using the short-range wireless protocol.

* * * * *